(12) United States Patent
Peters

(10) Patent No.: US 7,688,804 B2
(45) Date of Patent: Mar. 30, 2010

(54) METHOD OF PROVIDING FAULT TOLERANCE IN A SIP BASED CONTACT HANDLING ENVIRONMENT

(75) Inventor: Michael Peters, Downer's Grove, IL (US)

(73) Assignee: Aspect Software, Inc., Lombard, IL (US)

( * ) Notice: Subject to any disclaimer, the term of this patent is extended or adjusted under 35 U.S.C. 154(b) by 1360 days.

(21) Appl. No.: 11/053,396

(22) Filed: Feb. 8, 2005

(65) Prior Publication Data

US 2006/0176805 A1    Aug. 10, 2006

(51) Int. Cl.
*H04L 12/66* (2006.01)
(52) U.S. Cl. .................. 370/352; 370/392; 379/265.02
(58) Field of Classification Search .......... 370/352–356
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 5,970,134 A * | 10/1999 | Highland et al. | 379/265.02 |
| 6,002,760 A | 12/1999 | Gisby | |
| 6,005,920 A * | 12/1999 | Fuller et al. | 379/9.05 |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,138,139 A | 10/2000 | Beck et al. | |
| 6,167,395 A | 12/2000 | Beck et al. | |
| 6,170,011 B1 | 1/2001 | Beck et al. | |

(Continued)

FOREIGN PATENT DOCUMENTS

GB        2 408 410        5/2005

(Continued)

OTHER PUBLICATIONS

Amir Zmora, "B2BUA: Enabling Class 5 Capabilities in SIP Designs" [Online], Sep 9, 2003, Radvision Technology, Available from: http://www.commsdesign.com/printableArticle/;jsessionid=OWFEQBYQHXCDIQSNDBGCKHSCJUMEKJVN?articleID=16502048 May 30, 2006.

*Primary Examiner*—Simon Sing

(57) ABSTRACT

A method and apparatus are provided for processing a contact with a client within a contact distributor. The method includes the steps of providing a primary SIP back-to-back user agent and an associated secondary SIP back-to-back user agent for each resource of a plurality of resources of the contact distributor and setting up a communication connection between the client and a resource of the plurality of resources through the provided primary back-to-back user agent of the resource. The method further includes the steps of an availability server monitoring the communication connection between the client and the resource, the availability server detecting a failure of the primary back-to-back user agent and the availability server transferring the connection from the primary back-to-back user agent to the associated secondary back-to-back user agent of the resource when the primary back-to-back user agent fails.

30 Claims, 3 Drawing Sheets

U.S. PATENT DOCUMENTS

| | | | |
|---|---|---|---|
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,535,991 B1 | 3/2003 | Gallant et al. | |
| 6,553,113 B1 * | 4/2003 | Dhir et al. | 379/265.02 |
| 6,680,943 B1 * | 1/2004 | Gibson et al. | 370/392 |
| 6,732,156 B2 | 5/2004 | Miloslavsky | |
| 7,002,989 B2 * | 2/2006 | Agrawal et al. | 370/467 |
| 7,020,707 B2 * | 3/2006 | Sternagle | 709/230 |
| 7,046,680 B1 * | 5/2006 | McDysan et al. | 370/396 |
| 7,076,042 B1 * | 7/2006 | Praturi et al. | 379/201.01 |
| 7,082,130 B2 * | 7/2006 | Borella et al. | 370/389 |
| 7,403,607 B2 * | 7/2008 | Hession et al. | 379/265.12 |
| 2003/0063623 A1 | 4/2003 | Leslie et al. | |
| 2003/0185200 A1 | 10/2003 | Beyda | |
| 2004/0032862 A1 | 2/2004 | Schoeneberger et al. | |
| 2004/0037407 A1 | 2/2004 | Gourraud et al. | |
| 2005/0094582 A1 * | 5/2005 | Forissier et al. | 370/261 |
| 2005/0135335 A1 | 6/2005 | Hession et al. | |

FOREIGN PATENT DOCUMENTS

| | | |
|---|---|---|
| GB | 2 410 650 | 8/2005 |

* cited by examiner

METHOD OF PROVIDING FAULT TOLERANCE IN A SIP BASED CONTACT HANDLING ENVIRONMENT

FIELD OF THE INVENTION

The field of the invention relates to computer systems and more particularly, to automatic call distributors.

BACKGROUND OF THE INVENTION

Automatic call distributors (ACDs) are known. Such systems are typically used by organizations to serve large numbers of callers through the Public Switched Telephone Network (PSTN). Typically, inbound calls are directed to a common telephone number of the organization and distributed to agents based upon some criteria (e.g., agent idle time).

In addition to handling inbound calls, ACDs may also process outbound calls. Typically, a controller monitors a workload of its agents. Where a workload of received calls falls below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

While automatic call distributors work relatively well, they are not particularly well suited to the Internet. The standards that are used for processing switched circuit calls and exchanging control information through the PSTN cannot be used within the Internet. Often the elements of Internet contact distributors are distributed to geographically diverse locations. As a result, management of resources and the detection of system failure becomes much more difficult. Because of the importance of Internet contact distributors, a need exists for a method and apparatus for detecting system failure that is more flexible.

SUMMARY

A method and apparatus are provided for processing a contact with a client within a contact distributor. The method includes the steps of providing a primary SIP back-to-back user agent and an associated secondary SIP back-to-back user agent for each resource of a plurality of resources of the contact distributor and setting up a communication connection between the client and a resource of the plurality of resources through the provided primary back-to-back user agent of the resource. The method further includes the steps of an availability server monitoring the communication connection between the client and the resource, the availability server detecting a failure of the primary back-to-back user agent and the availability server transferring the connection from the primary back-to-back user agent to the associated secondary back-to-back user agent of the resource when the primary back-to-back user agent fails.

DETAILED DESCRIPTION OF AN ILLUSTRATED EMBODIMENT

Figure 1:
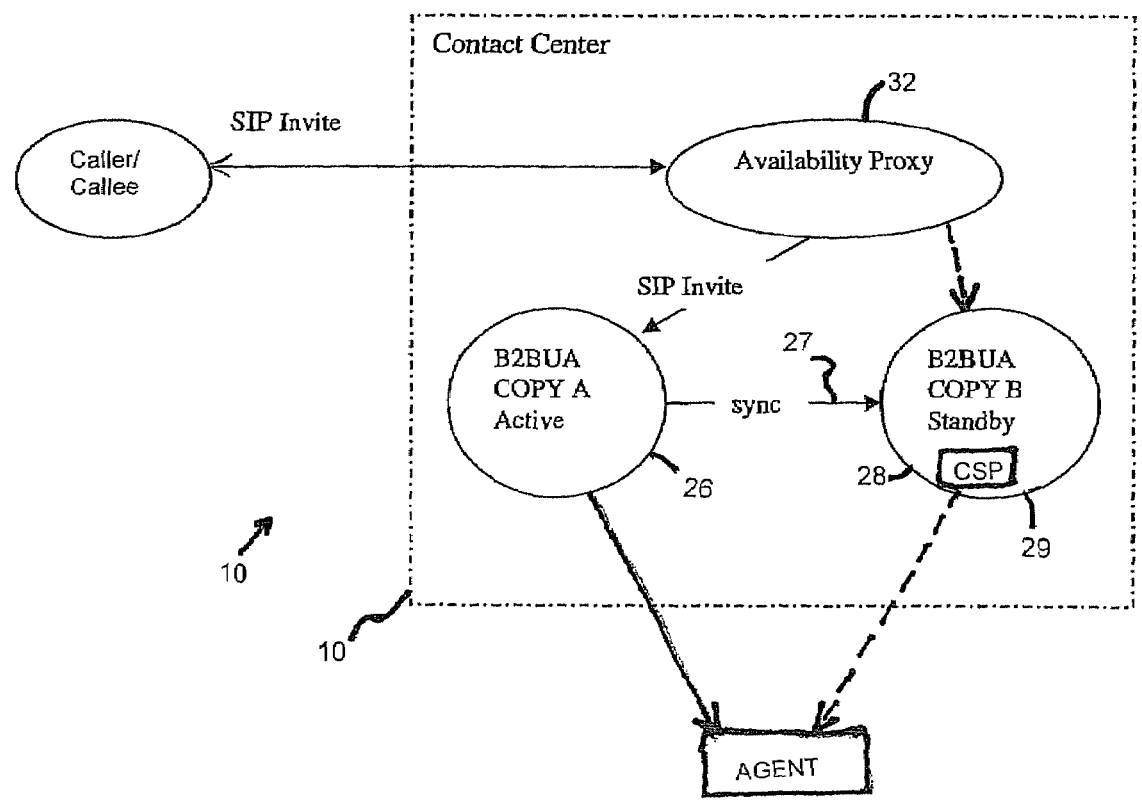
FIG. 1 is a simplified block diagram of a connection path of a fault tolerant automatic contact processor in accordance with an illustrated embodiment of the invention.
Figure 2:
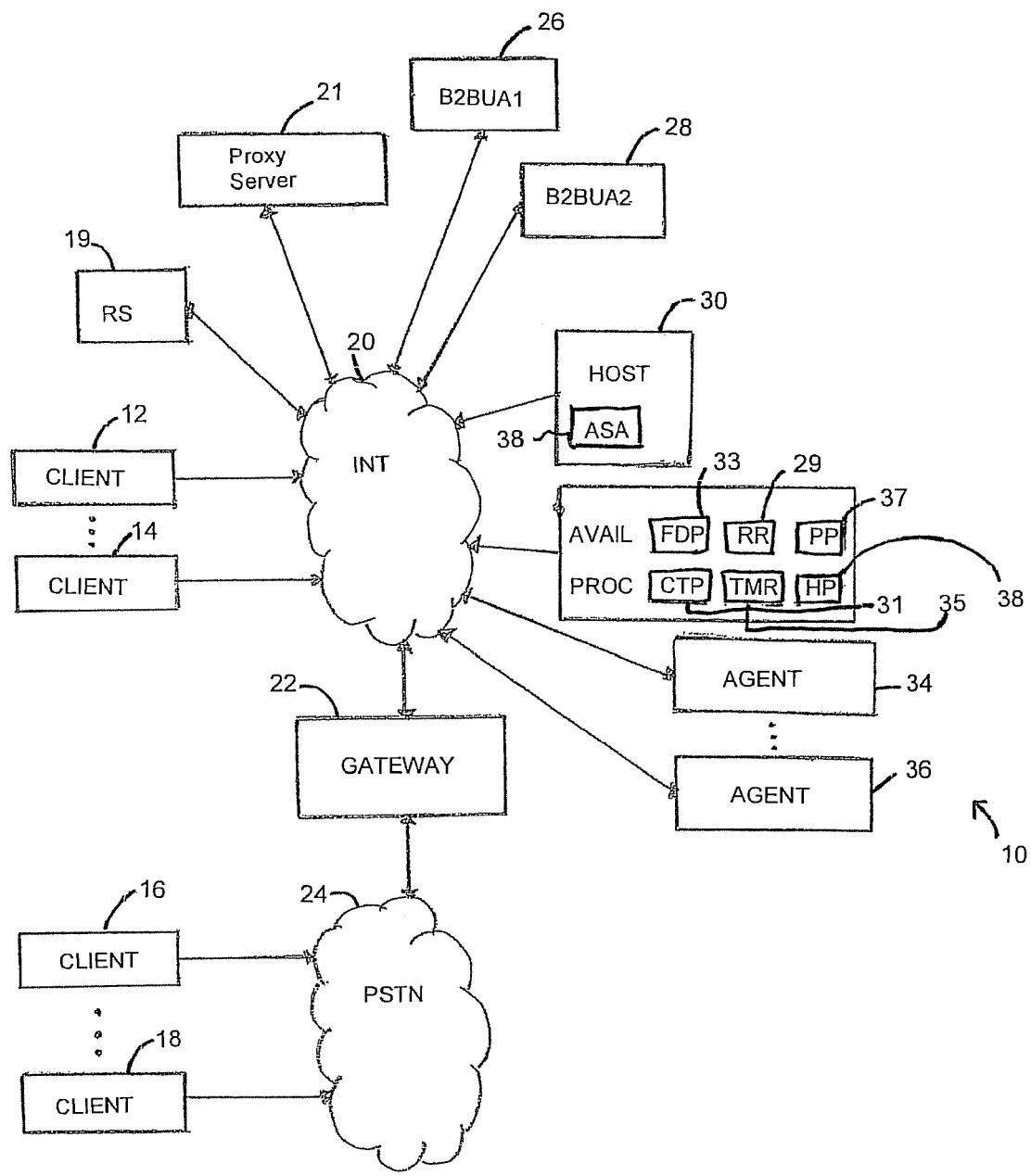
FIG. 2 is a block diagram that shows the connection path of FIG. 1 in a context of use within an automatic contact distributor.

FIG. 1 is a simplified block diagram of a fault tolerant contact distribution system 10 shown generally in accordance with illustrated embodiments of the invention. FIG. 2 is a block diagram of the contact distribution system 10 shown in a context of use. The contact distribution system 10 may be used by an organization to process contacts between clients and agents of the organization.

Contacts between the clients of the organization may occur primarily through the Internet 20 under any appropriate Internet format (e.g., e-mail, Instant Messaging (IM), Voice-over-Internet Protocol (VoIP), etc.). In addition, contacts may also be supported that occur at least partially through the PSTN 24 as switched circuit calls. The term "contact" will be used herein as a more general term that refers to communication sessions that occur exclusively through the Internet and to communication sessions that occur at least partially through the Internet and partially through the PSTN 24.

The fault tolerance of the system 10 may be provided for each contact via an availability proxy and a pair of back-to-back user agents (B2BUAs), where the B2BUAs operate substantially as described in Internet Engineering Task Force (IETF) RFC #3261. One B2BUA of the pair of B2BUAs may be used to provide a connection between client and agent and the other B2BUA may be used as a backup. When the primary B2BUA fails, the availability proxy detects the failure and transfers the connection to the second B2BUA.

As used herein, the term B2BUA refers to a software application operating on a server (e.g., a central processing unit (CPU)). In addition, the B2BUAs 26, 28 may operate on different servers so that if the first server (upon which a primary B2BUA operates) should fail, then the secondary B2BUA may continue to operate on a second server. In general, reference made herein to a processing step also refers to the processor (e.g., the subroutine) that performs that step.

In general, the system 10 may be used by any of a number of different organizations (e.g., commercial, environmental, political, etc.) to advance the agenda of the organization. In order to promulgate the agenda of the organization to its clients 12, 14, 16, 18, the organization may publish, by advertising or otherwise, one or more telephone numbers or universal resource locators (URLs) that identify communication paths to the organization. Contacts in this case may be initiated by the client via inbound contact to the system 10.

Alternatively, the organization may purchase contact lists that contain communication system addresses (e.g., telephone numbers, Universal Resource Locators (URLs), e-mail addresses etc.) of potential clients. In this case, the organization may initiate contacts with clients via an outgoing campaign through the host 30 of the system 10.

The contact distribution system 10 may process contacts using Session Initiation Protocol (SIP) as described in IETF RFC #3261. In this regard, the system 10 may receive incoming contacts or place outgoing contacts through the Internet 20 or through the Internet 20 and PSTN 24 using a gateway 22.

The use of a SIP protocol allows two or more participants to establish a communication session wherein one or more media streams is exchanged with each participant. The media streams may be audio, video or any other combination of Internet-based communication mediums. The simultaneous setup and use of audio and video by the system 10 for one call between two or more parties is one example.

The system 10 may include a host 30 that places and receives calls and that distributes those calls to the agents 34, 36 of the organization. One or more agent selection applications 38 may be provided within the host 30 for detecting calls and for selecting an agent for handling each call.

Calls may be placed to and received from the organization (i.e., the system 10) using any of a number of different communication devices. For example, one client may place or receive calls through a SIP telephone 12 or personal computer 14 that is equipped with SIP communication software and that is connected directly to the Internet 20 or through an Internet Service Provider (ISP).

For example, to contact the organization, a client may enter a published telephone number of the organization (e.g., 1234567890) into his SIP telephone 12. Entry of a telephone number into the SIP telephone 12 causes the telephone 12 to compose a number of messages that ultimately result in a call be directed to the organization.

Similarly, if a PSTN subscriber 16, 18 were to wish to contact the organization, the subscriber 16, 18 would enter that same telephone number into his telephone. The entered number would cause the PSTN 24 to route the call to the gateway 22. The gateway 22 may assign a Voice-over-Internet Protocol (VoIP) application to service the call. Once the VoIP application is assigned to service the call, a call initiated through the PSTN 24 may be handled in the same way as a contact from a SIP telephone 12.

In order to contact the organization, the telephone 12 must first locate a proxy server. To locate a proxy server, the telephone 14 may first perform a DNS SRV query to locate an Internet proxy server 21 (e.g., at prox.com). Upon locating a proxy server, the telephone may compose a SIP INVITE 100 that incorporates the entered telephone number and send the packet message to the proxy server 21. As used herein, an INVITE is an Internet SIP message composed in accordance with IETF RFC #3261.

The proxy server 21 first identifies and then forwards the INVITE to a URL or URI associated with the entered telephone number. As a first step in forwarding the INVITE, the proxy server 21 may send a query to a registration server 19 to identify a URL of the organization. The registration server 19 serves as a registrar for PSTN telephone numbers registered by web entities. Registration with the registration server 19 in this case means registering a URL that corresponds to the registered PSTN telephone number.

Within the registration server 19, the telephone number within the SIP INVITE may be used as a pointer to identify a location within a lookup table. Within the identified location may be a URL of the registering web entity. In this case, the registering web entity may be the organization and the URL registered by the SIP entity may be an agent selection application 38 within the host 30 of the system 10. In this example, the host 30 may have a domain name of "host.com" and may have registered the URL of "1234567890@host.com" for use with the registered telephone number.

The prefix "1234567890" within the URL may be used as an identifier to route the INVITE to the application 38 and as an identifier of a call type. In fact, the host 30 may register many different telephone numbers with the registration server 19 where each registration identifies the application 38 and each prefix identifies a different call type to the application 38. Alternatively, the prefixes may be used as a routing identifier to route each call type to a different agent selection application 38.

In order to redirect the INVITE to the host 30, the proxy 21 may insert the registered domain name into a destination address field of the SIP INVITE. Once the address field of the INVITE has been changed to the URL associated with the host 30, the proxy server 21 may forward the INVITE to the host 30.

Within the host 30, a user agent may be provided that receives and identifies each modified INVITE. As each INVITE is received, a call typing processor within the user agent compares the prefix of the destination address with a list of registered PSTN telephone numbers to identify those calls that will be directed to agents 34, 36 and to determine a call type of those calls. Once the INVITE is determined as being intended for an agent, the INVITE may be forwarded to the appropriate agent selection application 38. The application 38 may parse the INVITE to retrieve an identifier of the dialed telephone number and the URL of the caller 12.

The dialed telephone number may be used to identify a subject matter of the call. The URL of the caller 12 may provide information about prior contacts with this caller 12.

In a similar manner, SIP INVITEs may be composed for communication sessions under other formats (e.g., IM, e-mail, etc.). In each case, a communication format may be negotiated using a Session Description Protocal (SDP) as described in IETF RFC #2327.

Within the application 38, an agent 34, 36 may be selected to handle the call from an agent list. The agent list may contain a current list (and universal resource indicators (URIS) or URLS) of agents 34, 36 who have signed into the host 30 and are currently available to receive calls. Also included within the agent list may be a cross-referenced list of skills (e.g., call or contact types) for which each agent is proficient.

The agent 34, 36 may be selected based upon idle time or upon skill in handling this particular type of contact. Upon selection of an agent 34, 36, the application 38 may redirect the contact to the selected agent (e.g., 34) in such a way as to route messages between the agent and client through a B2BUA 26, 28. The application may do this in any of a number of ways (e.g., using an availability server 32).

As used herein, a B2BUA 26, 28 is a processor (e.g., a router) that receives packets addressed to a first address and reroutes the packets to a second address. Routing within a B2BUA 26, 28 may be based upon directives from a process within the contact center 10 that is responsible for controlling the treatment of contacts.

The availability server 32 may serve two functions. In addition to routing a SIP INVITE from the host 30 to the appropriate B2BUA 26, 28, the availability server 32 may also monitor the availability of the B2BUA 26, 28 for purposes of detecting the failure of any particular B2BUAs 26, 28.

The B2BUAs 26, 28 functions to conceal the URL of the agents 34, 36 from any serviced client 12, 14, 16, 18. Concealment of the URL of the agent 34, 36 from the client 12, 14, 16, 18 is performed to allow the organization to more effectively control agent utilization and to prevent clients 12, 14, 16, 18 from contacting agents directly without first contacting the organization (i.e., the host 20).

On the agent side, the B2BUA 26, 28 may use third party call control (as defined under SIP) to connect agent phones to the agent side of the B2BUA 26, 28 for the purpose of being joined with a caller. The event that triggers the agent side of the B2BUA 26, 28 to initialize the third party call control software for a particular agent phone may be an agent signing in via a desktop application.

Connection of the agent 34, 36 to a B2BUA 26, 28 results in the creation of the first leg of the connection during a contact between the agent 34, 36 and a client 12, 14, 16, 18. The second leg of the connection occurs as described below when a contact is assigned to the agent 34, 36.

In addition to concealing the URL of any assigned agent 34, 36, the B2BUA 26, 28 provides a convenient location to "park" a call. For example, if all agents 34, 36 are busy, then the B2BUA 26, 28 may be used to connect the caller 12 to an interactive voice response unit (IVR) until an agent becomes available. Within the IVR, additional information may be collected from the contact.

On the caller side, the B2BUA 26, 28 accepts SIP calls and may forward signaling and media into the call system 10 on behalf of the caller. Once the caller is essentially "parked" at the B2BUA 26, contact center applications can direct the B2BUA 26, 28 to manipulate the signaling or media streams of the caller for the purpose of treatment and, ultimately, connection with an agent.

The agent selection application 38 may send a SIP instant message to the B2BUA (e.g., 26) that includes the SIP INVITE, and an identifier of the agent or a media server for announcements (e.g., an IVR, etc.). The instant message to the B2BUA 26 may cause the B2BUA 26 to perform routing for purposes of creating a second leg of the communication path between the B2BUA 26 and client 12. That routing information may be placed into a persistent store (e.g., a file in a database of the B2BUA 26). Within the B2BUA 26, a connection processor operating under the business rules of the organization will route the client over a first leg of the connection to the appropriate SIP entity within the contact center using SIP methods.

Upon receiving the SIP INVITE from the agent selection application 38, the B2BUA 26 may respond to the INVITE of the caller in the manner prescribed for a user agent by RFC 3261 to set up the second leg of the connection that would ultimately include a selected agent (e.g., 34). In this regard, a call setup processor 29 within the B2BUA 26, 28 may process the SIP INVITE to set up a connection between the client 12 and the agent 34. If the agent 34 had previously signed into the B2BUA 26, then the final connection from caller to agent will be made by joining the two dialogs within the B2BUA 26, 28 or equivalent entity.

Upon completion of the connection, the B2BUA 26 may send a SIP "200 OK" message to the client 12 and the client 12 may return an "ACK SIP:agent34@B2BUA26.com" to acknowledge completion of setup of a communication channel. Upon receipt by the B2BUA 26, a connection processor may substitute "agent34@host.com" for the destination URL and "client12@B2BUA26.com" for the source URL for any messages received by the B2BUA 26, 28 that are forwarded to the agent 34, 36. In message received from the agent 34 by the B2BUA 26, 28 to be forwarded to the client 12, the connection processor may substitute "client12@phone.com for the destination URL and "agent34@B2BUA26.com for the source URL.

As discussed above, the host 30 may use a number of B2BUAs 26, 28. One B2BUA (e.g., 26) may be a primary B2BUA and another associated B2BUA (e.g., 28) may be a secondary B2BUA.

While the system 10 is shown as having only two B2BUAs, it should be understood that the system 10 may have any number of B2BUAs 26, 28. In general, it may be assumed that each contact handled by the system 10 has both a primary and a second B2BUA 26, 28. In fact, every time a contact is set up by the system 10 between a client 12, 14, 16, 18 and resource of the system (e.g., agent, IVR, etc.), the host 30 may spawn a primary and a secondary B2BUA 26, 28 to handle the contact. The spawned primary and secondary B2BUA 26, 28 of each contact may be transferred to and operated on separate servers.

As mentioned above, as each contact is processed, it may be routed through the availability server 32. In order to monitor the availability of each B2BUA 26, 28, the availability server 32 may insert a RECORD ROUTE header into the SIP INVITE that it transfers to the B2BUA 26, 28.

Activating the RECORD ROUTE function causes all subsequent communication of the contact between the B2BUA 26, 28 and client 12, 14, 16, 18 to flow through the availability server 32. The communication flow of the contact through the availability server 32 allows the availability server 32 to monitor and to detect failure of any particular B2BUA 26, 26.

With regard to the B2BUAs 26, 28, the primary and secondary B2BUAs 26, 28 are programmed to synchronize data. In this regard, the primary and secondary B2BUA 26, 28 form a communication link 27 (FIG. 1). The communication link 27 allows the secondary B2BUA 26, 28 to synchronize with (track the logical state of) the primary B2BUA 26, 28 during the various contact states between contact set-up and contact tear-down. By allowing the secondary B2BUA 26, 28 to track the state of the primary B2BUA 26, 28, the secondary B2BUA 26, 28 may step in and replace the primary B2BUA 26, 28, whenever the primary B2BUA 26, 28 fails.

In this regard, the availability server 32, maintains a call record of the state of each contact. A failure detection processor 33 within the availability server 32 may monitor the status of the primary B2BUA 26, 28. Monitoring may be accomplished in any number of ways. For example, a pinging processor 37 within the failure detection processor may periodically "ping" the primary B2BUA 26, 28. Alternately, a heartbeat processor 38 may listen to detect a heartbeat periodically sent from the primary B2BUA 26, 28. If the primary B2BUA 26, 28 should fail to respond to the pinging or hear the heartbeat, then the failure detection processor 33 may determine that the primary B2BUA 26, 28 has failed.

Alternatively, the failure detection processor 33 may set a timer 33 as each communication element is transferred to the primary B2BUA 26, 28. If the timer 35 times out before a response is received from the primary B2BUA 26, 28, then the failure detection processor transfers the contact to the secondary B2BUA 26, 28.

Figure 3:
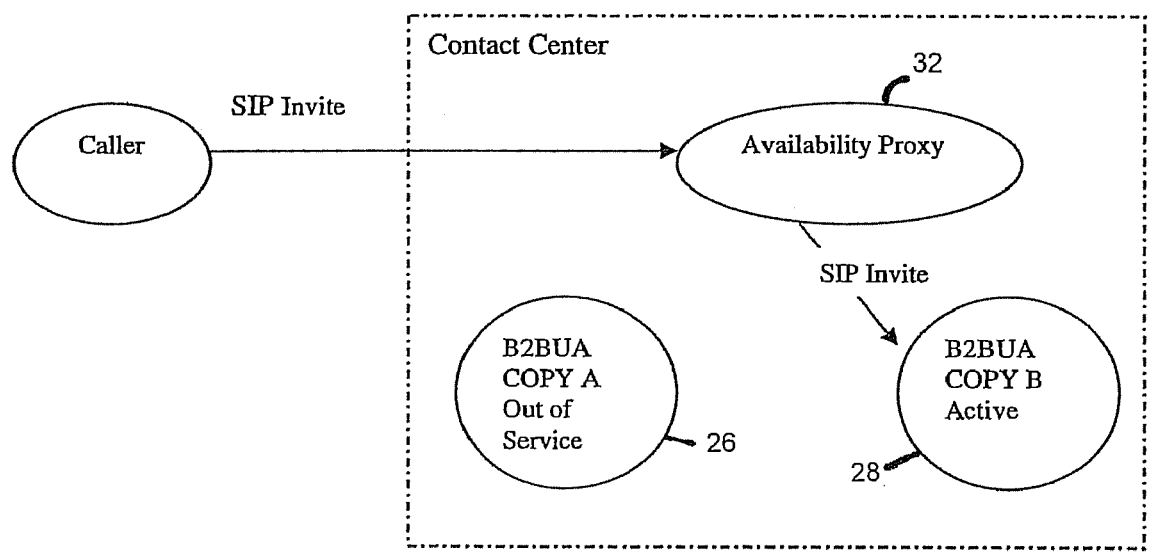
FIG. 3 shows the connection path of FIG. 1 after a detected failure.

To activate the secondary B2BUA 26, 28, the failure detection processor 33 causes a call transfer processor 31 to transfer an activation code and the last contact control element received from the client 12 to the secondary B2BUA 26, 28. The secondary B2BUA 26, 28 may then step into the shoes of the primary B2BUA 26, 28 to re-establish the contact between the client 12 and agent 34 through the formerly secondary B2BUA 26, 28. Re-establishing the contact may be accomplished by sending an "INVITE/200/ACK" sequence (i.e., a SIP re-INVITE), as shown in FIG. 3.

Once the formerly secondary B2BUA 26, 28 has assumed the primary B2BUA function, the formerly primary B2BUA may assume the secondary function once it comes back on line. In this regard, the new primary B2BUA 26, 28 may now attempt to synchronize the new secondary B2BUA 26, 28 and the process may repeat.

A specific embodiment of method and apparatus for distributing calls has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of processing a contact with a client at least partially through on Internet within a contact distributor, such method comprising:
    providing a primary SIP back-to-back user agent processor and an associated different secondary SIP back-to-back user agent processor for each resource of a plurality of resources of the contact distributor wherein each user agent processor receives SIP messages addressed to a first address and reroutes them to a second address to conceal agent addresses from the client;
    setting up a communication connection between the client and a resource of the plurality of resources through the provided primary back-to-back user agent processor of the resource;
    an availability SIP server monitoring the communication connection between the client and the resource and transferring a SIP INVITE message with an inserted RECORD ROUTE header to the user agent processors in order to monitor availability of each user agent processor;
    the availability SIP server detecting a failure of the primary back-to-back user agent processor; and
    the availability SIP server transferring the connection from the primary back-to-back user agent processor to the associated secondary back-to-back user agent processor of the resource by routing subsequent SIP messages to the secondary back-to-back user agent processor when the primary back-to-back user agent processor fails.

2. The method of processing the contact with the client as in claim 1 wherein the step of setting up the communication connection further comprises the availability server receiving a SIP INVITE requesting set up of the connection.

3. The method of processing the contact with the client as in claim 1 further comprising the availability server activating a SIP RECORD ROUTE function during set up of the connection between the client and the resource of the contact distributor.

4. The method of processing the contact with the client as in claim 1 further comprising the availability server modifying a SIP INVITE by activating a SIP RECORD ROUTE function during set up of the connection between the client and the resource of the contact distributor.

5. The method of processing the contact with the client as in claim 4 further comprising the availability server routing the modified SIP INVITE to a primary back-to-back user agent processor during contact set up.

6. The method of processing the contact with the client as in claim 1 wherein the step of detecting the failure of the primary back-to-back user agent processor further comprises detecting a time out of a SIP message associated with the message connection.

7. The method of processing the contact with the client as in claim 1 wherein the step of detecting the failure of the primary back-to-back user agent processor further comprises pinging the primary back-to-back user agent processor and failing to detect a response.

8. The method of processing the contact with the client as in claim 1 wherein the step of detecting the failure of the primary back-to-back user agent processor further comprises periodically sending a heartbeat message from the primary back-to-back user agent processor to the availability server.

9. The method of processing the contact with the client as in claim 1 wherein the step of transferring the contact to the secondary back-to-back user agent processor further comprises the availability server intercepting a message of the connection and upon detecting the failure of the primary back-to-back user agent processor substituting a universal resource indicator of the secondary back-to-back user agent processor in place of a universal resource indicator of the primary back-to-back user agent processor.

10. The method of processing the contact with the client as in claim 1 further comprising synchronizing a data set of the secondary back-to-back user agent processor with a data set of the primary back-to-back user agent processor.

11. The method of processing the contact with the client as in claim 1 further comprising locating the primary and secondary back-to-back user agent processor on different servers.

12. An apparatus for processing a contact at least partially through an Internet with a client within a contact distributor, such apparatus comprising:
    means for providing a primary SIP back-to-back user agent processor and an associated different secondary SIP back-to-back user agent processor for each resource of a plurality of resources of the contact distributor wherein each user agent processor receives SIP messages addressed to a first address and reroutes them to a second address to conceal agent addresses from the client;
    means for setting up a communication connection between the client and a resource of the plurality of resources through the provided primary back-to-back user agent processor of the resource;
    means within an availability SIP server for monitoring the communication connection between the client and the resource and for transferring a SIP INVITE message with an inserted RECORD ROUTE header to the user agent processors in order to monitor availability of each agent processor;
    means within the availability SIP server for detecting a failure of the primary back-to-back user agent processor; and
    means within the availability server for transferring the connection from the primary back-to-back user agent processor to the associated secondary back-to-back user agent of the resource by routing subsequent SIP messages to the secondary back-to-back user agent processor when the primary back-to-back user agent processor fails.

13. The apparatus for processing the contact with the client as in claim 12 wherein the means for setting up the communication connection further comprises means within the availability server for receiving a SIP INVITE requesting set up of the connection.

14. The apparatus for processing the contact with the client as in claim 12 further comprising means within the availability server the activating a SIP RECORD ROUTE function during set up of the connection between the client and the resource of the contact distributor.

15. The apparatus for processing the contact with the client as in claim 12 further comprising means within the availability server for modifying a SIP INVITE by activating a SIP RECORD ROUTE function during set up of the connection between the client and the resource of the contact distributor.

16. The apparatus for processing the contact with the client as in claim 15 further comprising means within the availability server for routing the modified SIP INVITE to a primary back-to-back user agent processor during contact set up.

17. The apparatus for processing the contact with the client as in claim 12 wherein the means for detecting the failure of the primary back-to-back user agent processor comprises means for detecting a time out of a SIP message associated with the message connection.

18. The apparatus for processing the contact with the client as in claim 12 wherein the means for detecting the failure of the primary back-to-back user agent processor further comprises means for pinging the primary back-to-back user agent processor and failing to detect a response.

19. The apparatus for processing the contact with the client as in claim 12 wherein the means for detecting the failure of the primary back-to-back user agent processor further comprises means for periodically sending a heartbeat message from the primary back-to-back user agent processor to the availability server.

20. The apparatus for processing the contact with the client as in claim 12 wherein the means for transferring the contact to the secondary back-to-back user agent processor further comprises means within the availability server for intercepting a message of the connection and upon detecting the failure of the primary back-to-back user agent processor substituting a universal resource indicator of the secondary back-to-back user agent processor in place of a universal resource indicator of the primary back-to-back user agent processor.

21. The apparatus for processing the contact with the client as in claim 12 further comprising means for synchronizing a data set of the secondary back-to-back user agent processor with a data set of the primary back-to-back user agent processor.

22. The apparatus for processing the contact with the client as in claim 12 further comprising means for locating the primary and secondary back-to-back user agent processor on different servers.

23. An apparatus for processing a contact at least partially through an Internet with a client within a contact distributor, such apparatus comprising:
   a primary SIP back-to-back user agent processor and an associated different secondary SIP back-to-back user agent processor for each resource of a plurality of resources of the contact distributor wherein each user agent processor receives SIP messages addressed to a first address and reroutes them to a second address to conceal agent addresses from the client;
   a call setup processor that sets up a communication connection between the client and a resource of the plurality of resources through the provided primary back-to-back user agent processor of the resource;
   an availability SIP server that monitors the communication connection between the client and the resource, that transfers a SIP INVITE with an inserted RECORD ROUTE header to the user agent processors in order to monitor availability of each user agent processor and that detects a failure of the primary back-to-back user agent processor; and
   a call transfer processor within the availability server that transfers the connection from the primary back-to-back user agent processor to the associated secondary back-to-back user agent processor of the resource by routing subsequent SIP messages to the secondary back-to-back user agent processor when the primary back-to-back user agent processor fails.

24. The apparatus for processing the contact with the client as in claim 23 further comprising a SIP INVITE from the client that the call setup processor sends to the primary back-to-back user agent processor for purposes of setting up the connection.

25. The apparatus for processing the contact with the client as in claim 24 further comprising a SIP RECORD ROUTE header that the call setup processor inserts into the SIP INVITE.

26. The apparatus for processing the contact with the client as in claim 23 wherein the availability server further comprises a fault detection processor.

27. The apparatus for processing the contact with the client as in claim 26 wherein the fault detection processor further comprises a timer that detects a time-out of a SIP message associated with the message connection.

28. The apparatus for processing the contact with the client as in claim 26 wherein the fault detection processor further comprises a pinging processor that pings the primary back-to-back user agent processor to detect failure.

29. The apparatus for processing the contact with the client as in claim 26 wherein the fault detection processor further comprises a heartbeat processor that detects a heartbeat message from the primary back-to-back user processor.

30. The apparatus for processing the contact with the client as in claim 23 Luther comprising a communication link that synchronizes a data set of the secondary back-to-back user agent with a data set of the primary back-to-back user agent processor.

* * * * *